(12) United States Patent
Flinn

(10) Patent No.: US 8,628,283 B1
(45) Date of Patent: Jan. 14, 2014

(54) SEED TRANSPORTER

(75) Inventor: James Erick Flinn, Claypool, IN (US)

(73) Assignee: Par-Kan Company, Silver Lake, IN (US)

( * ) Notice: Subject to any disclaimer, the term of this patent is extended or adjusted under 35 U.S.C. 154(b) by 42 days.

(21) Appl. No.: 13/432,813

(22) Filed: Mar. 28, 2012

(51) Int. Cl.
*B60P 7/08* (2006.01)
(52) U.S. Cl.
USPC ................. 410/80; 410/33; 410/94; 111/200
(58) Field of Classification Search
USPC ........... 410/3, 4, 7, 32, 33, 34, 80, 90, 91, 94, 410/95, 66, 67, 121; 292/302; 224/42.4, 224/554; 111/200, 925; 248/500, 503
See application file for complete search history.

(56) References Cited

U.S. PATENT DOCUMENTS

| | | | | |
|---|---|---|---|---|
| 5,607,270 A | * | 3/1997 | Zimmerman | 410/3 |
| 5,618,138 A | * | 4/1997 | Lockhart | 410/69 |
| 6,099,220 A | * | 8/2000 | Poth | 410/94 |

* cited by examiner

*Primary Examiner* — Stephen Gordon
(74) *Attorney, Agent, or Firm* — Botkin & Hall, LLP; Michael D. Marston

(57) ABSTRACT

A seed transporter for transporting seeds in their seed boxes having a frame with an upper surface for supporting the seed box. The frame has upstanding members that extend upwardly from the frame and are adapted for contacting opposite sides of the seed box and for restraining movement of the seed box when the seed box is located between the upstanding members. The upstanding members include a draw bar that is slidingly retained within the upstanding members. The draw bar includes a catch affixed to the draw bar adapted for catching a retention surface on the seed box. The draw bar is movable between a first and second position. The first position locates the catch above the retention surface and the second position locates the catch beyond the retention surface on the box.

9 Claims, 8 Drawing Sheets

SEED TRANSPORTER

BACKGROUND OF THE INVENTION

Seed for planting fields has been shipped in storage boxes for quite some time. The boxes are large and typically handled with fork trucks and transporters that are used to load seed into planters. Merely setting boxes on a transporter is not a safe and secure way to move the seed to the field from the point of delivery. The boxes must be locked down to a transporter so that seed boxes do not fall off of the transporter. A simple and safe mechanism that allows a single person to load boxes on a transporter is needed.

SUMMARY OF THE INVENTION

The present invention is related to a seed transporter for transporting seeds in their seed boxes that are typically used to ship the seed to a point of delivery. The seed transporter has a frame with an upper surface for supporting the seed box. The frame has upstanding members that extend upwardly from the frame. The upstanding members are adapted for contacting opposite sides of the seed box and for restraining movement of the seed box when the seed box is located between the upstanding members. The upstanding members include a draw bar that is slidingly retained within the upstanding members. The draw bar includes a catch affixed to the draw bar and being adapted for catching a retention surface on the seed box. The retention surface on the box extends for a portion of the length of the side of the box and is adjacent to the catch when the box is between the upstanding members. The draw bar is movable between a first and second position. The first position locates the catch above the retention surface and the second position locates the catch beyond the retention surface on the box.

In another aspect of the invention, the draw bars are fixed from rotation, and thus, the catches are fixed from rotation;

In another aspect of the invention the draw bars are biased into the second position with a spring.

In yet another aspect of the invention, the draw bars may be locked into the first position.

DETAILED DESCRIPTION OF INVENTION

Figure 1:
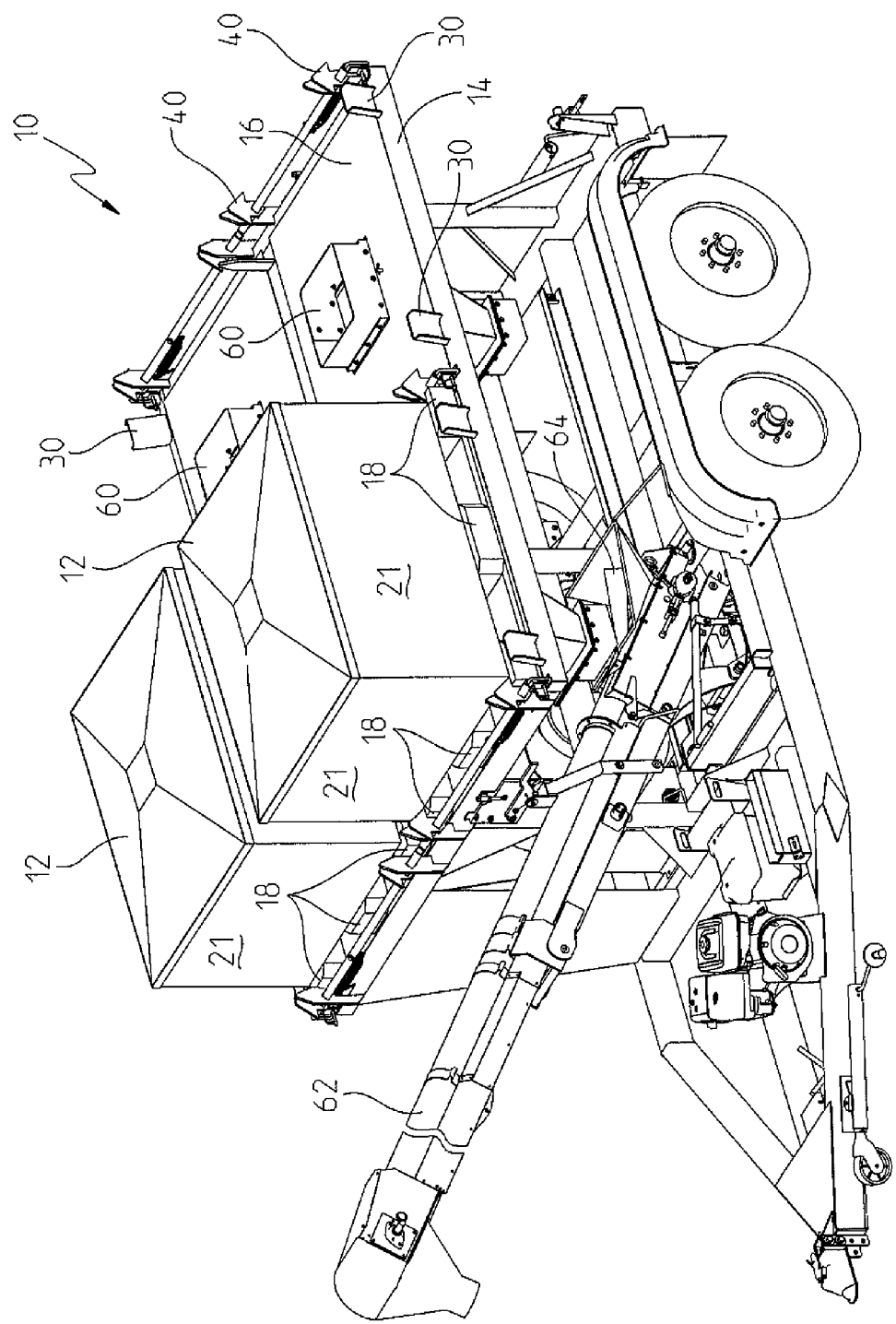
FIG. 1 is a perspective of the seed transporter including seed boxes loaded on the transporter.

FIG. 1 shows the seed transporter 10 with seed boxes 12 resting on the frame 14. The frame 14 is made from tubular steel and has an upper surface 16 on which the seed boxes 12 rest. The seed boxes 12 are standard boxes that are well known in the seed transporting art and are typically of the type in which seed is packaged and delivered to a farmer. Each seed box 12 is designed to be lifted with a fork truck, and this is typically how the boxes are placed on the seed transporter. To facilitate easy transportation with a fork truck, the boxes 12 include pads 18 that are spaced at appropriate intervals so that forks of a fork truck can fit between the pads 18 which raise the seed box 12 above the surface on which it rests. These pads 18 extend outwardly beyond sides 21 of the boxes and each pad extends for only a portion of its corresponding side 21 on which it is located. Each pad 18 has an upper surface that is used as a retention surface 20 that will be discussed below.

Figure 2:
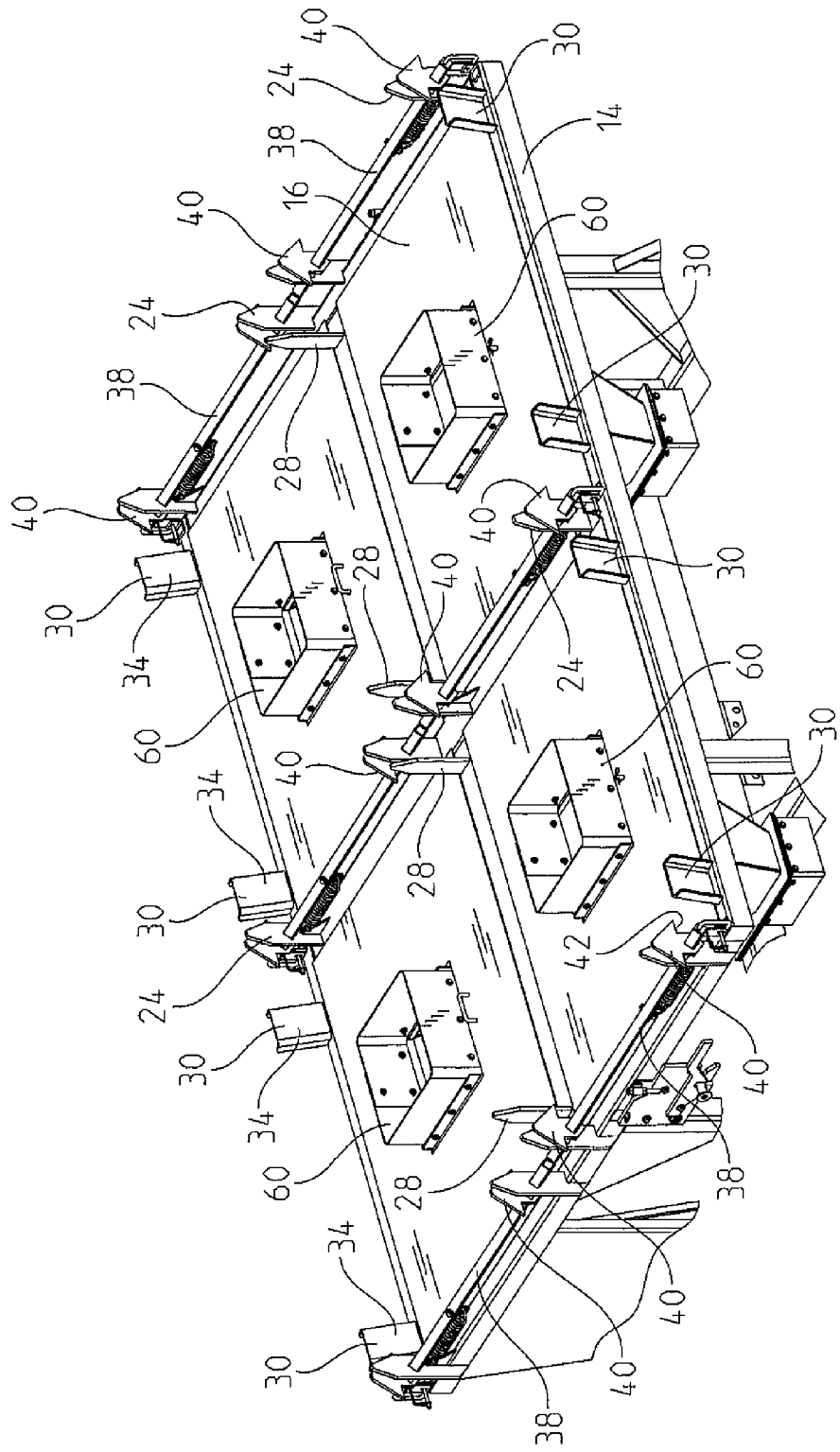
FIG. 2 is a perspective view of an upper portion of the seed transporter shown in FIG. 1.
Figure 3:
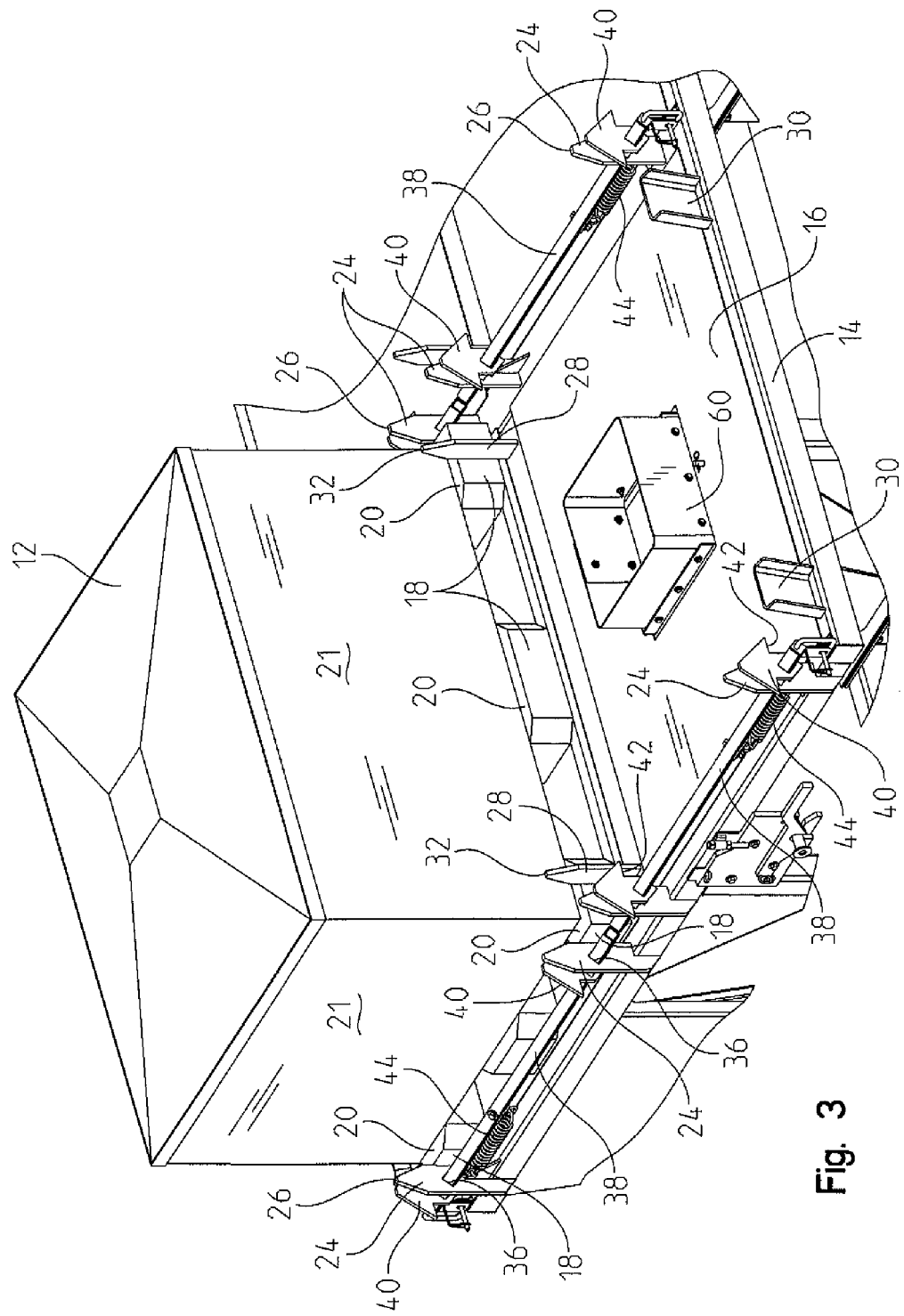
FIG. 3 is a perspective detail view of the upper portion of the seed transporter shown in FIG. 2.
Figure 4:
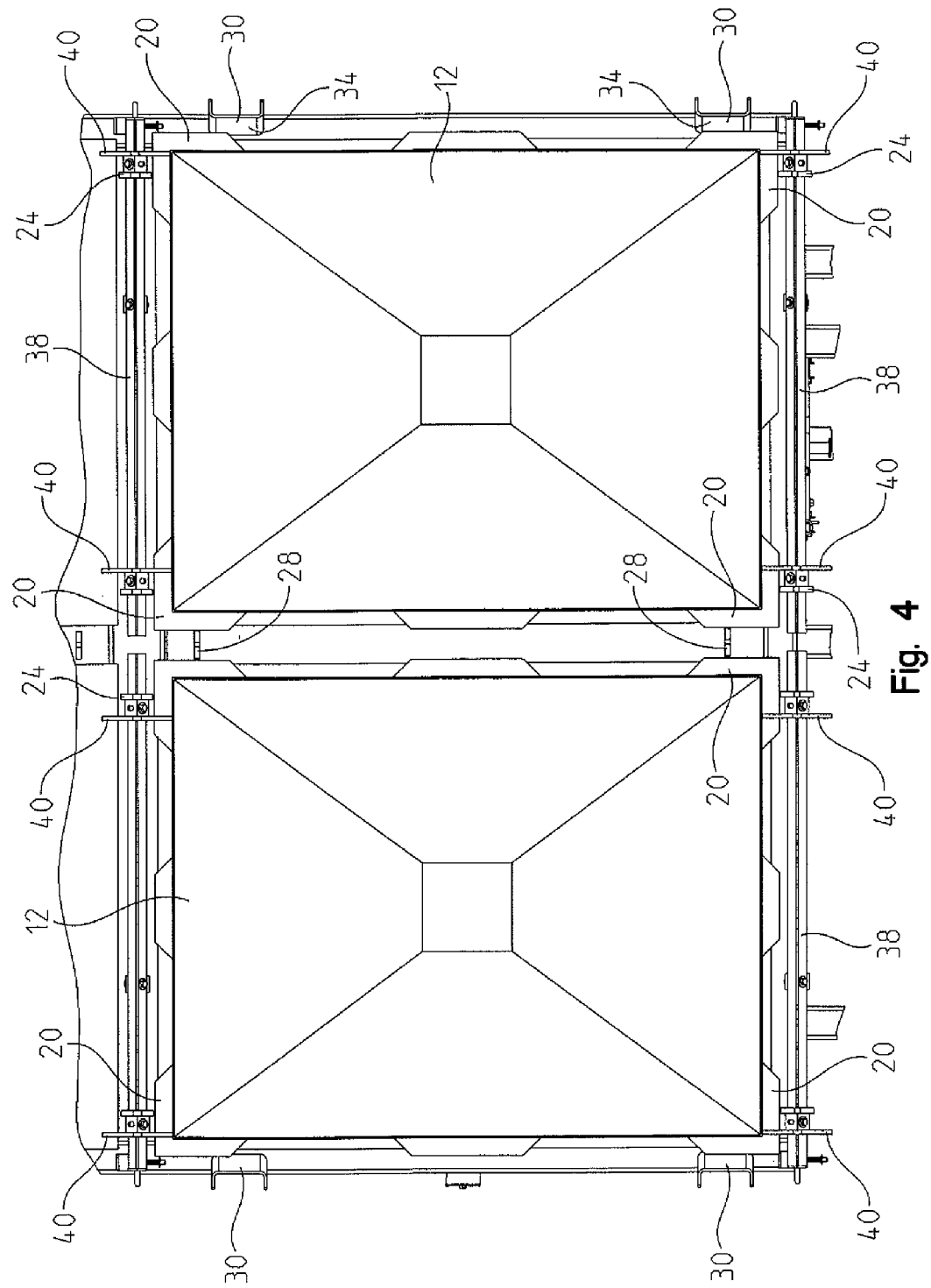
FIG. 4 is a top view of the seed transporter shown in FIG. 3.

Upstanding members 24 extend upwardly from the upper surface 16 of the frame 14. FIG. 2 shows the seed transporter 10 without the seed boxes 12 so that all of the upstanding members can be seen. The transporter shown in the FIGS. is designed to transport four seed boxes 12 at a time. The upstanding members 24 are aligned in pairs adjacent to the locations where the seed boxes 12 will be placed. The upstanding members 24 are welded to the frame 14 and have tapered upper ends 26. The tapered upper ends 26 are designed to guide a seed box 12 being placed on the transporter should it become misaligned from its proper position between opposing upstanding members. The upstanding members 24 are adapted for contacting the pads 18 on the seed boxes 12. Guides 28, 30 provide guidance to the seed boxes 12 in a direction transverse to that of upstanding members 24. Inner guides 28, are much like the upstanding members 24 having tapered upper ends 32. Outer guides 30, are constructed using C-channel stock that is welded to the frame 14 at an obtuse angle relative to the upper surface 16 so guides 30 point outwardly with a broad contact surface 34 for contacting pads 18 on the boxes.

Figure 5:
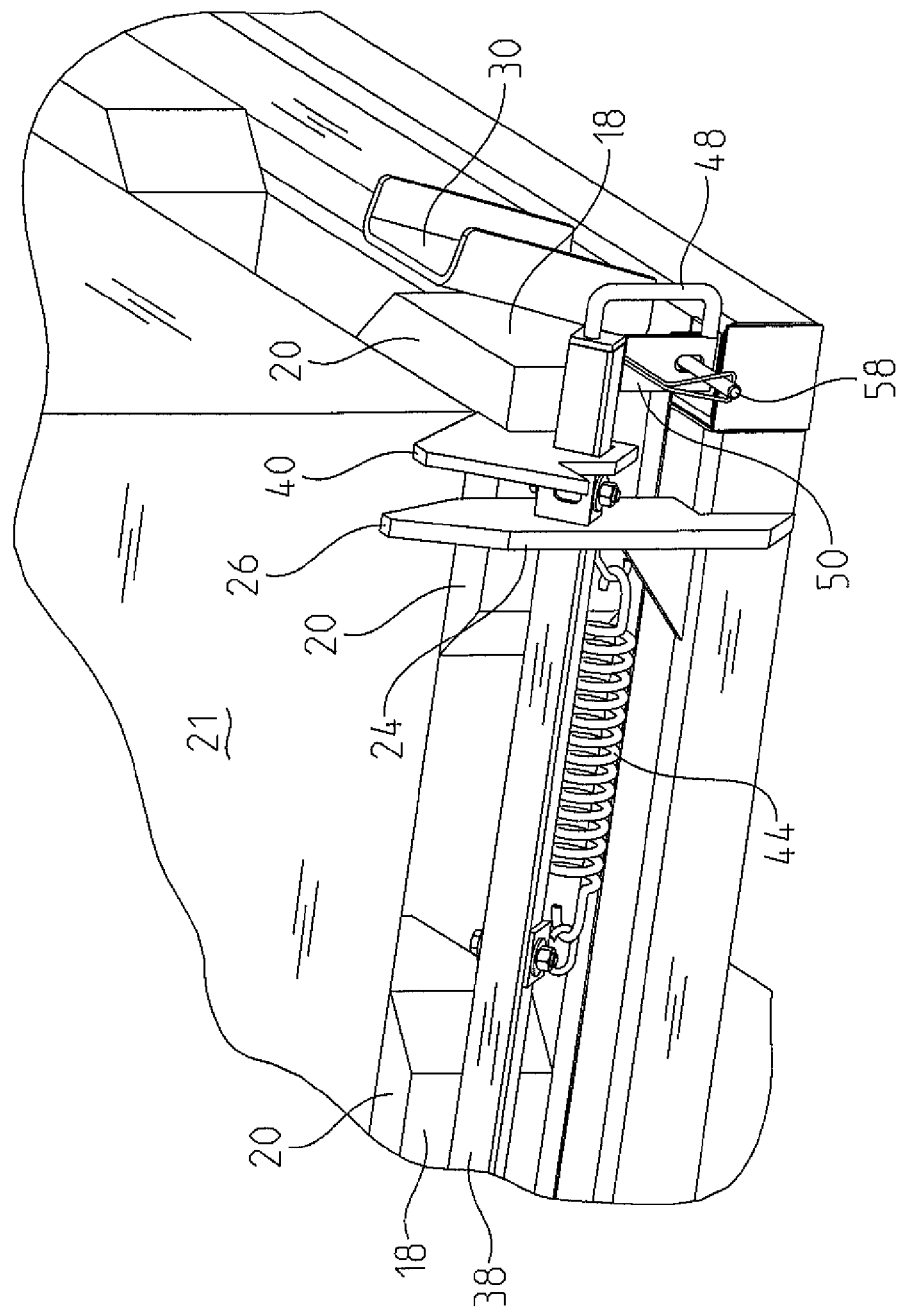
FIG. 5 is a perspective view of a corner of the seed box showing the draw bar in its first position.
Figure 6:
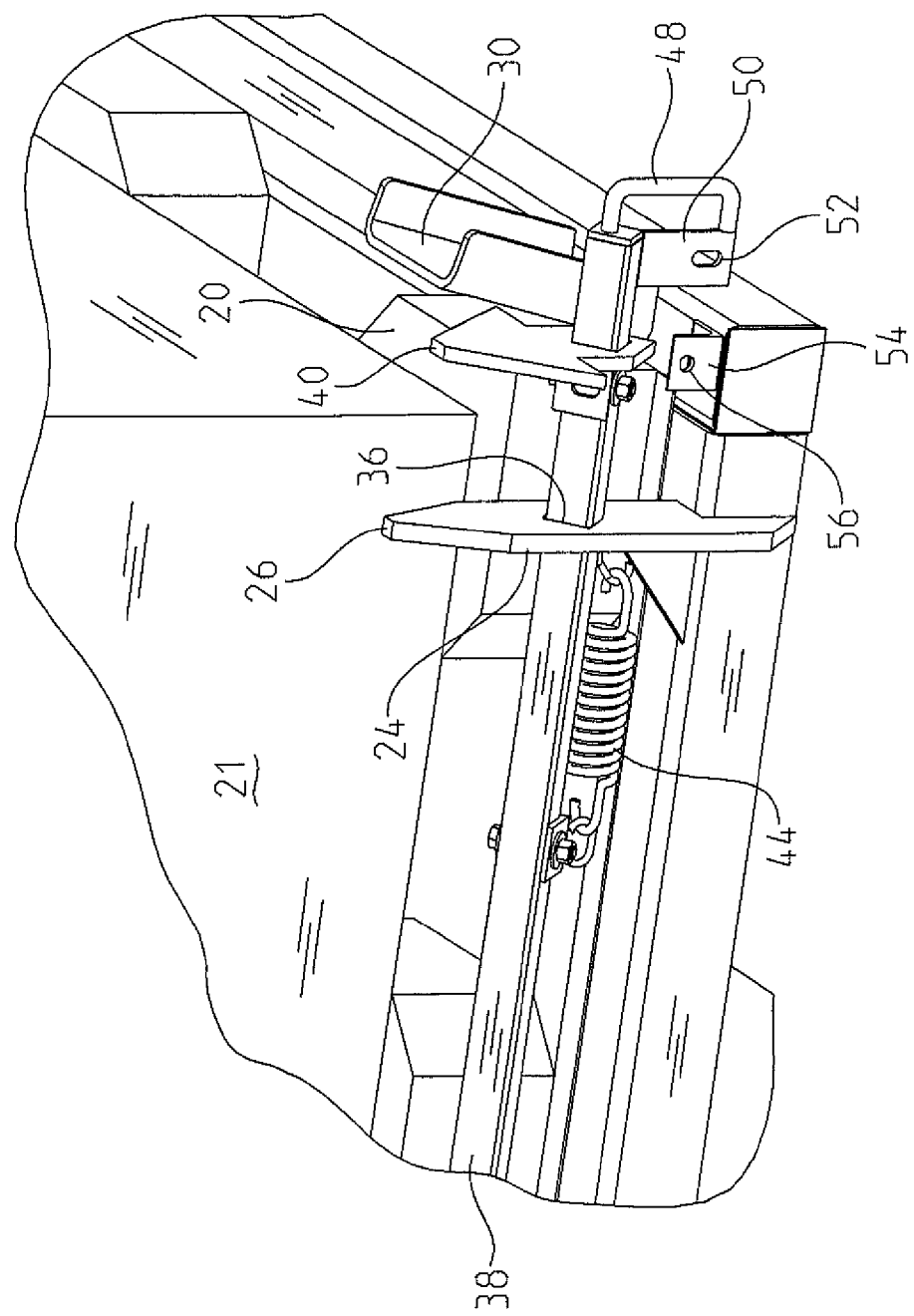
FIG. 6 is a perspective view of a corner of the seed box showing the draw bar in its second position.
Figure 7:
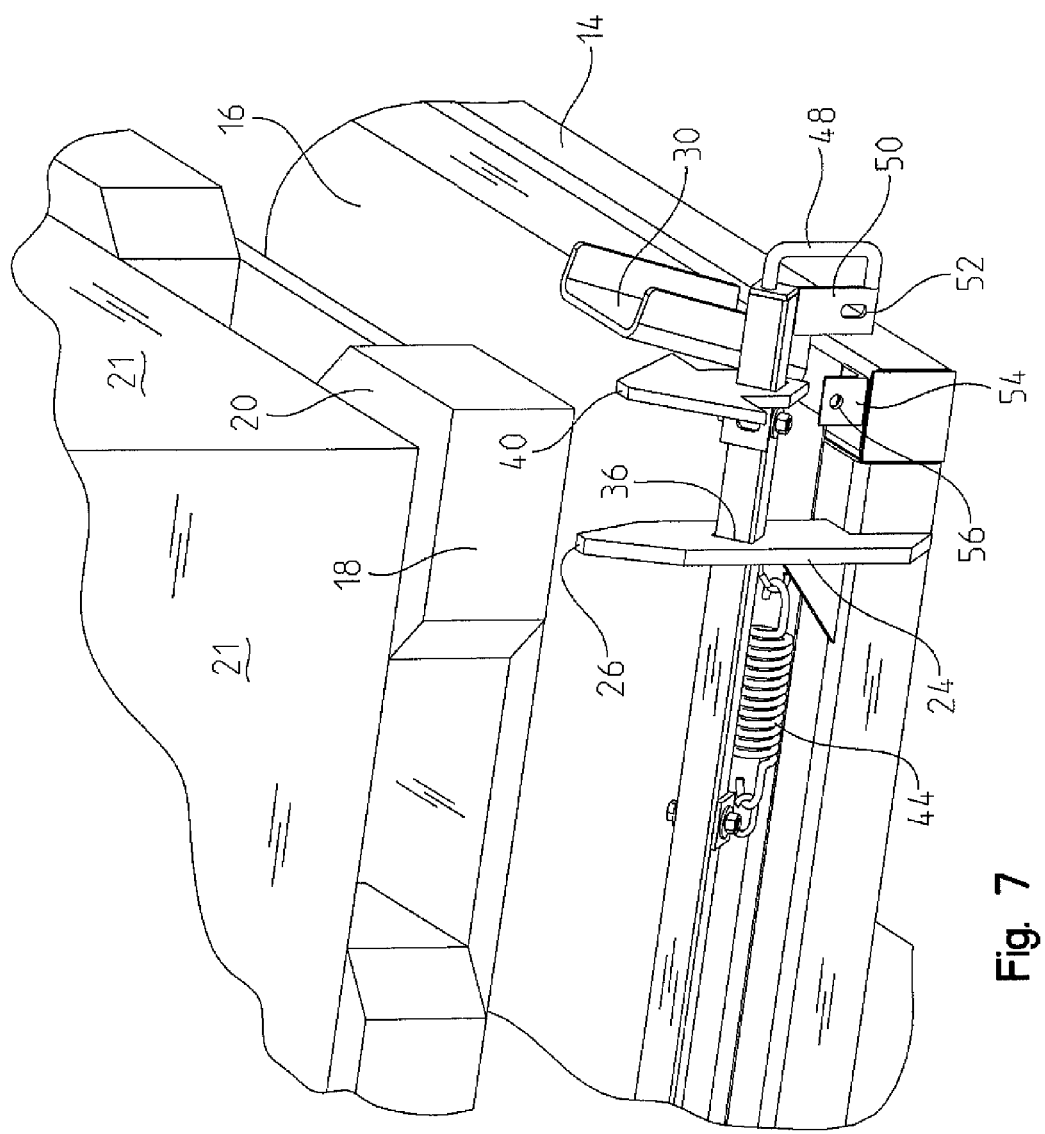
FIG. 7 is a perspective view of a corner of the seed box showing the seed box lifted from the transporter.
Figure 8:
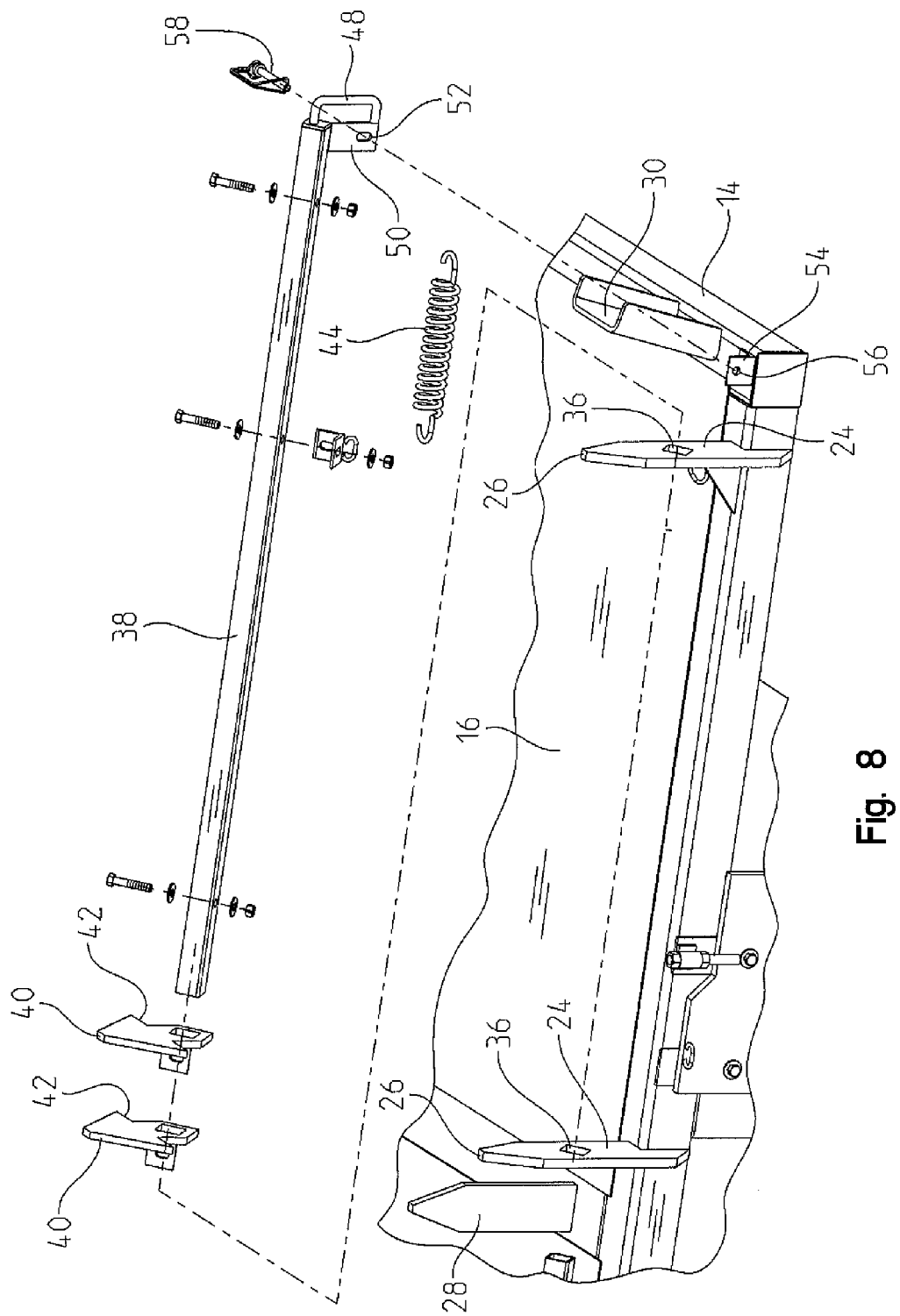
FIG. 8 is an exploded perspective view of the transporter showing the draw bar and associated parts.

Each of the upstanding members 24 within the pairs have apertures 36 for receiving a draw bar 38 that slides through the aperture 36. As can be seen in FIGS. 5 and 6, the aperture is a square shape, and the draw bar 38 is a square shaped tube. The draw bar 38 and aperture 36 need not be square shaped, but could be any complementary shape. This complementary relationship of the draw bar 38 and the aperture 36 allows sliding through the upstanding members 24, but restrains the draw bars 38 from rotating with respect to the upstanding members and the frame 14. Draw bars 38 are located on opposite sides of the location where the seed box 12 will be placed.

Each draw bar 38 has a pair of catches 40. Each catch 40 has a catch surface 42 that is adapted for contacting a corresponding retention surface 20 on the seed box 12. The draw bar 38 has a first position that locates the catches 40 over the pads 18 as shown in FIG. 5. The draw bar 38 also has a second position that locates the catches 40 beyond the pads 18 as shown in FIG. 6. A spring 44 biases the draw bar 38 into the second position, so that the catches 40 are not located above the pads 18. At the end of each draw bar 38 is a handle 48 that may be used to push the draw bar 38 into its first position. The draw bar 38 may be locked into its first position. A tab 50 is welded to the draw bar 38 adjacent to the handle 48 and includes hole 52. A second tab 54 is welded to the frame 14 and has a second hole 56. When the draw bar 38 is in its first position, the holes 52, 56 will be aligned. With the draw bar 38 in its first position and the holes 52, 56 aligned, a pin 58 may be inserted through both holes 52, 56 to lock the draw bar 38 into its first position. It is contemplated that the retention surfaces 20 could be inset into sides of the seed box 12 and portions of the seed box 12 adjacent to the inset retention surfaces could have gaps to allow the catches 40 to pass out of the box 12 when lifted. However, this is not shown due to the fact that most popularly used seed boxes 12 are of the type shown having retention surfaces 20 on pads 18 that extend outwardly from sides 21 of the box 12.

The seed transporter 10 has four dispensing chutes 60 that are centrally located within the four locations where the seed boxes 12 will rest. The seed boxes 12 are center dispensing so that seed may be dispensed through the dispensing chutes 60 without removing the boxes 12. A conveyor 62 having a hopper 64 may be positioned so that the hopper 64 is beneath a dispensing chute 60 of a corresponding seed box 12 from which seed is to be dispensed. When this is done, seed may be conveyed through the conveyor 62 into a planter or other seed container.

To use the seed transporter 10, a user will first remove pin 58 from holes 52, 56, if the pin is installed. The draw bar 38 will move into the second position, as shown in FIG. 6. The spring 44 holds the draw bar 38 in the second position so that a single user can use a fork truck to place the seed box 12, and while doing so, the catches 40 will not obstruct the seed box 12 from being placed. If a seed box 12 is in place, a fork truck will be used to remove the seed box 12. When the draw bars 38 on both sides of a seed box 12 are in the second position, a seed box 12 may be lifted because the catches 40 will not be located over pads 18. When a seed box 12 is placed onto the upper surface 16, the catches 40 will not strike the pads 18 because the guides 28, 30 will locate the seed box 12 so that the catches 40 pass between the pads. Once the seed box 12 rests on the upper surface, the user will push the handle 48 so that the draw bar 38 moves into the first position. In the first position, the pads 18 will be captured between the catch surface 42 and upper surface 16. With the draw bar 38 in the first position, the pin 58 will be inserted into holes 52, 56. This will be done with the draw bars 38 on both sides of the seed box 12 locked into their first position. The seed box 12 will be safely locked onto the transporter 10.

The invention is not limited to the details given above but may be modified within the scope of the following claims.

What is claimed is:

1. A seed transporter for transporting seed boxes, said seed transporter comprising: a frame having an upper surface for supporting one of said seed boxes, said frame including upstanding members extending upwardly of said frame, said upstanding members adapted for contacting opposite sides of said seed box and restraining movement of said seed box when said seed box is located between said upstanding members, wherein two of said upstanding members are aligned laterally to form a pair and include a draw bar slidingly retained within said pair of upstanding members, said draw bar including a catch affixed to said draw bar and adapted for catching a retention surface on said box, said retention surface extending for a portion of sides of said box, said catch adjacent to said retention surface when said box is between ones of said upstanding members, said draw bar having a first position locating said catch above said retention surface and said draw bar being slidable to a second position which positions said catch laterally beyond said retention surface on said box.

2. A seed transporter as claimed in claim 1, wherein guides are oppositely located from each other spaced transversely from said upstanding members and being adopted for locating said box in a traverse direction.

3. A seed transporter as claimed in claim 2, wherein said draw bar is held within apertures in each of said pair of upstanding members through which said draw bar passes, said draw bar having a complementary shape to said apertures so that said draw bar is fixed from rotation.

4. A seed transporter as claimed in claim 3, wherein said draw bar include a spring for biasing said draw bar into said second position.

5. A seed transporter as claimed in claim 4, wherein said draw bar includes a locking mechanism for locking said draw bar into first position.

6. A seed transporter as claimed in claim 5, wherein said locking mechanism comprises an aperture located on said draw bar and an aperture located on said frame, said apertures on said draw bar and on said frame being aligned when said draw bar is in its first position, said apertures on said draw bar and on said frame adapted for receiving a pin upon alignment thereby locking said draw bar in said first position.

7. A seed transporter as claimed in claim 6, further comprising a discharge chute located within said upper surface and adapted for communication of agricultural product from said box to a location below said upper surface.

8. A seed transporter as claimed in claim 6, further comprising a second pair of said upstanding members including a second drawbar slidably retained therein, said second drawbar including a second catch affixed to said second drawbar and adapted for catching a second retention surface on said box, said second drawbar being slidable between a first position in which said second catch is located above said second retention surface on said box and a second position which positions said second catch laterally beyond said second retention surface on said box.

9. A seed transporter as claimed in claim 7, further comprising a second pair of said upstanding members including a second drawbar slidably retained therein, said second drawbar including a second catch affixed to said second drawbar and adapted for catching a second retention surface on said box, said second drawbar being slidable between a first position in which said second catch is located above said second retention surface on said box and a second position which positions said second catch laterally beyond said second retention surface on said box.

* * * * *